(12) United States Patent
Carter

(10) Patent No.: US 11,788,674 B2
(45) Date of Patent: Oct. 17, 2023

(54) PORTABLE OSCILLATING FAN PLATFORM DEVICE

(71) Applicant: Dennis Carter, Greenwell Springs, LA (US)

(72) Inventor: Dennis Carter, Greenwell Springs, LA (US)

(*) Notice: Subject to any disclaimer, the term of this patent is extended or adjusted under 35 U.S.C. 154(b) by 0 days.

(21) Appl. No.: 17/718,375

(22) Filed: Apr. 12, 2022

(65) Prior Publication Data

US 2023/0113172 A1  Apr. 13, 2023

Related U.S. Application Data

(60) Provisional application No. 63/254,206, filed on Oct. 11, 2021.

(51) Int. Cl.
*F16M 11/20* (2006.01)
*F16M 11/22* (2006.01)
*F04D 25/10* (2006.01)

(52) U.S. Cl.
CPC ......... *F16M 11/2014* (2013.01); *F16M 11/22* (2013.01); *F04D 25/105* (2013.01); *F16M 2200/08* (2013.01)

(58) Field of Classification Search
CPC .............. F16M 11/2014; F16M 11/22; F16M 2200/08; F04D 25/105
USPC ...................... 248/127, 521, 522, 349.1, 357
See application file for complete search history.

(56) References Cited

U.S. PATENT DOCUMENTS

| | | | | |
|---|---|---|---|---|
| 4,555,990 A * | 12/1985 | Egawa | ................... | A47G 23/08 248/349.1 |
| 5,749,304 A * | 5/1998 | Turner | ................... | F16M 11/08 248/522 |
| 6,128,854 A * | 10/2000 | Chaney | ................... | A47G 7/041 47/39 |
| 6,231,020 B1 * | 5/2001 | Willson | ................. | F16M 11/08 248/922 |
| 6,530,550 B1 * | 3/2003 | Knighton | ............. | G01B 5/0004 248/349.1 |
| 7,028,968 B2 * | 4/2006 | Washick | ............... | A47G 33/126 248/521 |
| 8,672,287 B2 * | 3/2014 | Li | ........................ | E04H 12/2238 248/521 |

* cited by examiner

*Primary Examiner* — Anita M King
(74) *Attorney, Agent, or Firm* — Brennan, Manna & Diamond, LLC

(57) ABSTRACT

The present invention relates generally to the field of fans and heaters. More specifically, the present invention relates to a portable oscillating fan platform device. The device is comprised of a base that is further comprised of a rotating platform, a battery, a motor and a processor. A non-oscillating fan or heater can be placed on the rotating platform wherein the device can then be powered on and the platform can rotate, thereby rotating the fan or heater on the platform. The device may further have at least one button that allows a user to power the device on/off and may also allow a user to control the spinning of the platform. The base may further be comprised of a power cord, USB charging port, and female power receptacle that can be used to supply power to the fan/heater on top of the device.

20 Claims, 4 Drawing Sheets

PORTABLE OSCILLATING FAN PLATFORM DEVICE

CROSS-REFERENCE TO RELATED APPLICATION

The present application claims priority to, and the benefit of, U.S. Provisional Application No. 63/254,206 which was filed on Oct. 11, 2021 and is incorporated herein by reference in its entirety.

FIELD OF THE INVENTION

The present invention relates generally to the field of fans and heaters. More specifically, the present invention relates to a portable oscillating fan platform device. The device is comprised of a base that is further comprised of a rotating platform, a battery, a motor, and a processor. A non-oscillating fan or heater can be placed on the rotating platform wherein the device can then be powered on and the platform can rotate, thereby rotating the fan or heater on the platform. The device may further have at least one button that allows a user to power the device on/off and may also allow a user to control the spinning of the platform. The base may further be comprised of a power cord, USB charging port and female power receptacle that can be used to supply power to the fan/heater on top of the device. Accordingly, the present disclosure makes specific reference thereto. Nonetheless, it is to be appreciated that aspects of the present invention are also equally applicable to other like applications, devices and methods of manufacture.

BACKGROUND

Many individuals require heaters or fans to maintain an ideal body temperature or room temperature. A variety of small portable fans, heaters and similar devices of the like are known in the art and are used for this purpose. While many of said fans and heaters have the ability to oscillate, many others do not. This is undesirable, as some individuals may desire or require a fan or heater that does oscillate. However, oscillating fans and heaters are generally more expensive than their non-oscillating counterparts, which renders them cost-prohibitive for some users. In addition, some individuals may simply only have access to non-oscillating fans.

Therefore, there exists a long-felt need in the art for a device for non-oscillating fans and heaters. There also exists a long-felt need in the art for a portable oscillating fan platform device that allows a user to use a non-oscillating fan or heater in a manner similar to an oscillating fan or heater. In addition, there exists a long-felt need in the art for a portable oscillating fan platform device that can be universally used with any non-oscillating fan or heater, wherein the device allows the fan or heater to oscillates in a manner similar to an oscillating fan or heater.

The subject matter disclosed and claimed herein, in one embodiment thereof, comprises a portable oscillating fan platform device. The device is comprised of a base that is further comprised of a rotating platform, a battery, a motor and a processor. A non-oscillating fan or heater can be placed on the rotating platform, wherein the device can then be powered on and the platform can rotate, thereby rotating the fan or heater on the platform. The device may further have at least one button that allows a user to power the device on/off and may also allow a user to control the spinning of the platform. The base may further be comprised of a power cord, USB charging port, and female power receptacle that be used to supply power to the fan/heater that is on top of the device.

In this manner, the portable oscillating fan platform device of the present invention accomplishes all of the forgoing objectives and provides a device that allows a user to use a non-oscillating fan or heater in a manner similar to an oscillating fan or heater. Further, the device can be used universally with any non-oscillating fan or heater. As a result, the device allows additional functionality to be added to non-oscillating fans/heaters.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a portable oscillating fan platform device. The device is primarily comprised of a base that is further comprised of a rotating platform, a battery, a motor and a processor. In the preferred embodiment, the base is preferably manufactured from a durable metal or rigid plastic. The base is comprised of a flat top surface and a generally parallel and spaced apart flat bottom surface, as well as a side surface. In order to promote grip with a floor surface (or other surface that the device may be placed on) the bottom surface may be textured and made of an anti-slip rubber or other anti-slip material. The top surface of the base has a generally circular, rotating platform that a non-oscillating heater or fan can be placed on. To encourage grip between the bottom surface of the heater/fan and the top surface of the platform, the top surface of the platform may be textured and made of an anti-slip rubber or other anti-slip material.

The bottom surface of the platform is further comprised of a shaft that removably or fixedly attaches to the bottom surface. The shaft then connects to the motor which powers the shaft and propels it in a rotational manner. As a result, the shaft rotates the platform. The motor is further powered by a battery that may be charged via a USB charging port located on the side surface, top surface, or bottom surface of the base. Alternatively (or additionally), the side surface may be comprised of a conventional male power cord that can be plugged into a 110V/240V female wall outlet in order to power the battery and of a female 110V/240V outlet that can be used to power the fan or heater placed on top of the device.

The top surface and/or side surface is further comprised of at least one button that may allow the device to be powered on/off. In one embodiment, when the device is powered on the platform automatically begins to spin at a constant rate. In a differing embodiment, one of the at least one buttons may allow a user to control the spin rate of the platform. In any embodiment, the platform may spin 360 degrees or any lesser range. Further, one embodiment of the device may feature a button that allows a user to control a processor which is in electrical communication with the motor. The button allows a user to increase or decrease the range of motion in which the platform spins/oscillates via controlling the shaft and motor. As a result, the user can customize the spin rate of the platform in order to target specific areas of a room or their body. In one embodiment, the at least one button may be located on a remote that is in electrical communication with the processor via Wi-Fi, radio frequency, Bluetooth, infrared, etc.

To use the device, a user simply places a non-oscillating fan or heater onto the platform, wherein the fan/heater can then be plugged into a female power receptacle located on the side surface of the base. Then, the device can be powered on such that the fan/heater receives power and can also be powered on. Once the device has been powered on, the button can be pressed such that the platform will then rotate in order to rotate the fan/heater.

During use, a user simply places a non-oscillating fan or heater onto the platform, wherein the fan/heater can then be plugged into a female power receptacle located on the side surface of the base. Then, the device can be powered on such that the fan/heater receives power and can also be powered on. Once the device has been powered on, the button can be pressed such that the platform will then rotate in order to rotate the fan/heater.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
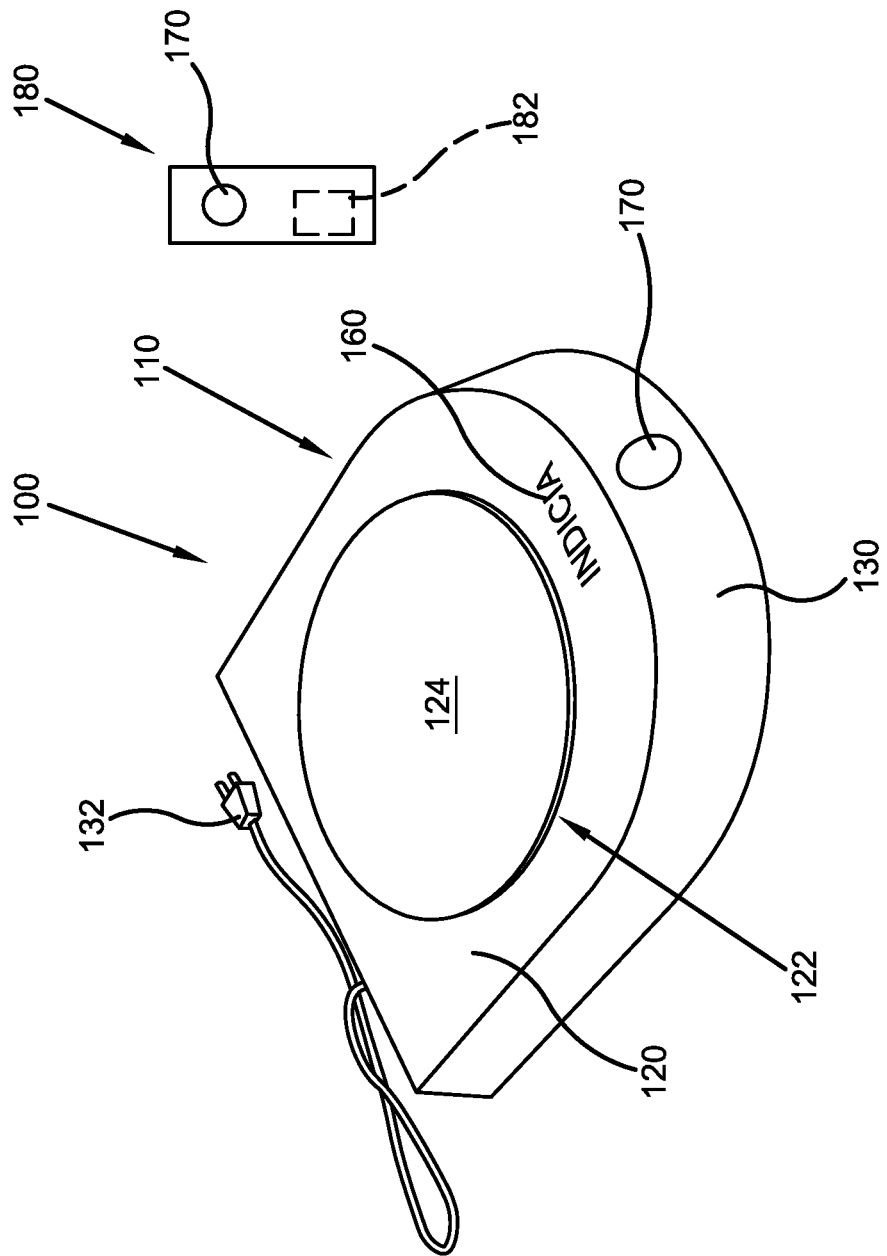
FIG. 1 illustrates a front perspective view of one potential embodiment of a portable oscillating fan platform device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device for non-oscillating fans and heaters. There also exists a long-felt need in the art for a portable oscillating fan platform device that allows a user to use a non-oscillating fan or heater in a manner similar to an oscillating fan or heater. In addition, there exists a long-felt need in the art for a portable oscillating fan platform device that can be universally used with any non-oscillating fan or heater, wherein the device allows the fan or heater to oscillate in a manner similar to an oscillating fan or heater.

The present invention, in one exemplary embodiment, is comprised of a portable oscillating fan platform device that is primarily comprised of a base that is further comprised of a rotating platform, a battery, a motor, and a processor. In the preferred embodiment, the base is preferably manufactured from a durable metal or rigid plastic and is comprised of a flat top surface and a generally parallel flat bottom surface as well as a side surface. In order to promote grip with a floor surface (or other surface that the device may be placed on) the bottom surface may be textured and made of an anti-slip rubber or other anti-slip material. The top surface of the base has a generally circular, rotating platform that a non-oscillating heater or fan can be placed on. To encourage grip between the bottom surface of the heater/fan and the top surface of the platform, the top surface of the platform may be textured and made of an anti-slip rubber or other anti-slip material.

The bottom surface of the platform is further comprised of a shaft that removably or fixedly attaches to the bottom surface, wherein the shaft then connects to the motor which powers the shaft and propels it in a rotational manner. As a result, the shaft rotates the platform. The motor is further powered by a battery that may be charged via a USB charging port located on the side surface, top surface, or bottom surface of the base. Alternatively (or additionally), the side surface may be comprised of a conventional male power cord that can be plugged into a 110V/240V female wall outlet in order to power the battery and of a female 110V/240V outlet that can be used to power the fan or heater placed on top of the device.

The top surface and/or side surface is further comprised of at least one button. The button may allow the device to be powered on/off. In one embodiment, when the device is powered on the platform automatically begins to spin at a constant rate. In a differing embodiment, one of the at least one buttons may allow a user to control the spin rate of the platform. In any embodiment, the platform may spin 360 degrees or any lesser range. One embodiment of the device may feature a button that allows a user to control a processor which is in electrical communication with the motor, wherein the button allows a user to increase or decrease the range of motion in which the platform spins/oscillates via controlling the shaft and motor. As a result, the user can customize the spin rate of the platform in order to target specific areas of a room or their body. In one embodiment, the at least one button may be located on a remote that is in electrical communication with the processor via Wi-Fi, radio frequency, Bluetooth, infrared, etc.

During use, a user simply places a non-oscillating fan or heater onto the platform, wherein the fan/heater can then be plugged into a female power receptacle located on the side surface of the base. Then, the device can be powered on such that the fan/heater receives power and can also be powered on. Once the device has been powered on, the button can be pressed such that the platform will then rotate in order to rotate the fan/heater.

Accordingly, the portable oscillating fan platform device of the present invention is particularly advantageous as it provides a device that allows a user to use a non-oscillating fan or heater in a manner similar to an oscillating fan or heater. Further, the device can be used universally with any non-oscillating fan or heater. As a result, the device allows additional functionality to be added to non-oscillating fans/ heaters. In this manner, the portable oscillating fan platform device overcomes the limitations of existing non-oscillating fans known in the art.

Referring initially to the drawings, FIG. 1 illustrates a front perspective view of one potential embodiment of a portable oscillating fan platform device 100 of the present invention in accordance with the disclosed architecture. The device 100 is primarily comprised of a base 110 that is further comprised of a rotating platform 122, a battery 150, a motor 152 and a processor 154. In the preferred embodiment, the base 110 is preferably manufactured from a durable metal, such as but not limited to, stainless steel or aluminum. In a differing embodiment the base 110 may be manufactured from a durable rigid plastic such as, but not limited to, an acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, recycled plastic, biodegradable plastic, etc. In differing embodiments, the base 110 and platform 122 may be any color in the art and may be transparent, semi-transparent or opaque. Further, the base 110 and platform 122 may have a plurality of indicia 160 such as, but not limited to, patterns, logos, emblems, images, symbols, designs, letters, words, characters, animals, advertisements, brands, etc.

The base 110 may be any conventional or irregular shape known in the art. In the embodiment shown in the FIGS. 1-4, the base 110 is comprised of a flat top surface 120 and a generally parallel flat bottom surface 140 as well as a side surface 130. In order to promote grip with a floor surface 20 or other surface that the device 100 may be placed on, the bottom surface 140 may be textured and made of an anti-slip rubber or other anti-slip material. The top surface 120 is further comprised of a generally circular, rotating platform 122. A non-oscillating heater or fan 10 can then be placed on the top surface 124 of the platform 122. To encourage grip between the bottom surface 12 of the heater/fan 10 and the top surface 124 of the platform 122, the top surface 124 of the platform 122 may be textured and made of an anti-slip rubber or other anti-slip material.

Figure 2:
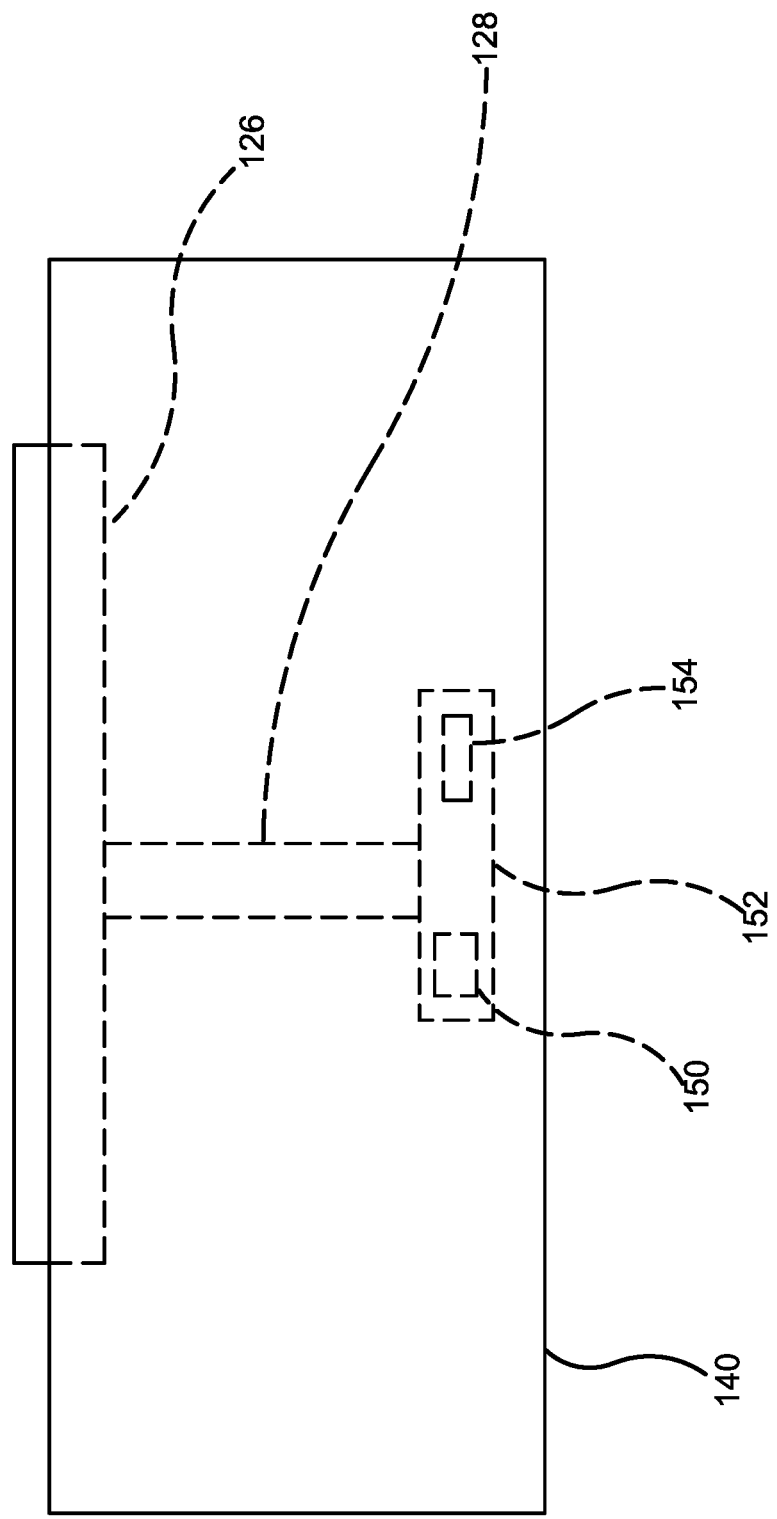
FIG. 2 illustrates a side view of one potential embodiment of a portable oscillating fan platform device of the present invention in accordance with the disclosed architecture.

FIG. 2 illustrates a side view of one potential embodiment of a portable oscillating fan platform device 100 of the present invention in accordance with the disclosed architecture. The bottom surface 126 of the platform 122 is further comprised of a shaft 128 that removably or fixedly attaches to the bottom surface 126. The shaft 128 then connects to the motor 152 which powers the shaft 128 and propels it in a rotational manner, which in turn rotates the platform 122.

Figure 3:
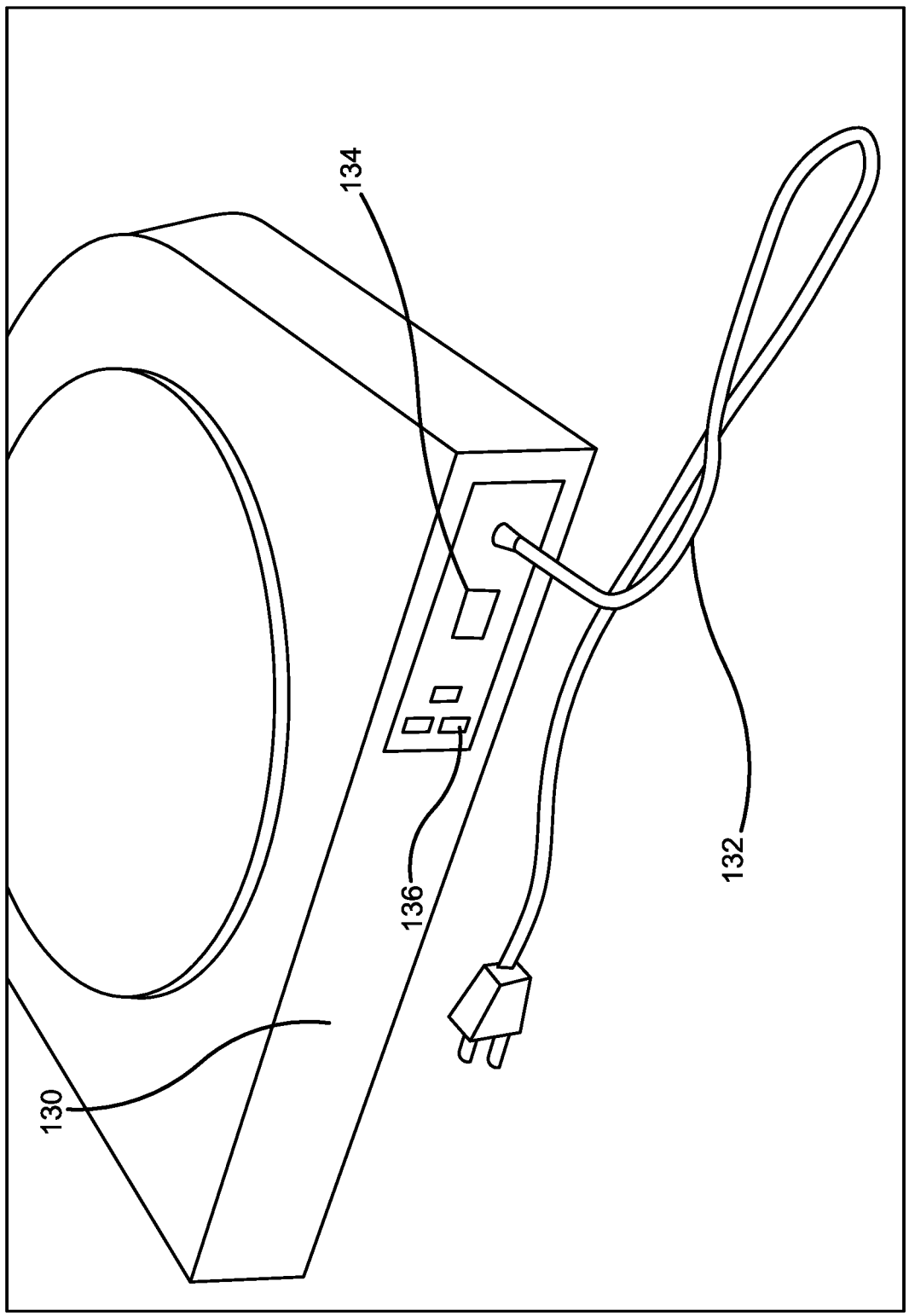
FIG. 3 illustrates a rear perspective view of one potential embodiment of a portable oscillating fan platform device of the present invention in accordance with the disclosed architecture.

FIG. 3 illustrates a rear perspective view of one potential embodiment of a portable oscillating fan platform device 100 of the present invention in accordance with the disclosed architecture. The motor 152 is further powered by a battery 150. The battery 150 may be a disposable battery 150 or a rechargeable battery 150 in the form of an alkaline, nickel-cadmium, nickel-metal hydride battery 150, etc., such as any 3V-12 volts DC battery 150 or other conventional battery 150 such as A, AA, AAA, etc. that supplies power to the device 100. Throughout this specification the terms "battery" and "batteries" may be used interchangeably to refer to one or more wet or dry cells or batteries 150 of cells in which chemical energy is converted into electricity and used as a source of DC power. References to recharging or replacing batteries 150 may refer to recharging or replacing individual cells, individual batteries 150 of cells or a package of multiple battery cells as is appropriate for any given battery 150 technology that may be used. Additionally, the battery 150 may be charged via a USB charging port 134 located on the side surface 130, top surface 120 or bottom surface 140 of the base 110. In differing embodiments, the charging port 134 may be a plurality of USB types such as but not limited to: USB-A, USB-B, Micro-B, Micro-USB, Mini-USB, USB-C, etc. Alternatively (or additionally), the side surface 130 may be comprised of a conventional male power cord 132 that can be plugged into a 110V/240V female wall outlet 30 in order to power the battery 150.

The top surface 120 and/or side surface 130 is further comprised of at least one button 170. The button 170 may allow the device 100 to be powered on/off. In one embodiment, when the device 100 is powered on the platform 122 automatically begins to spin at a constant rate. In a differing embodiment, one of the at least one buttons 170 may allow a user to control the spin rate of the platform 122. In any embodiment, the platform 122 may spin 360 degrees or any lesser range of movement. Accordingly, one embodiment of the device 100 may feature a button 170 that allows a user to control a processer 154, which is in electrical communication with the motor 152 and allows a user to increase or decrease the range of motion in which the platform 122 spins/oscillates via controlling the shaft 128 and motor 152. Therefore, the user can customize the spin rate of the platform 122 to only target specific areas of a room or their body. In one embodiment, the at least one button 170 may be located on a remote 180 that is in electrical communication with the processor 154 via a Wi-Fi, radio frequency, Bluetooth, infrared, etc., transmitter 182 within the remote 180. In this manner, a user need not physically get up and walk over to the device 100 to turn the device 100 on/off or to change or stop the spin rate of the platform 122.

Figure 4:
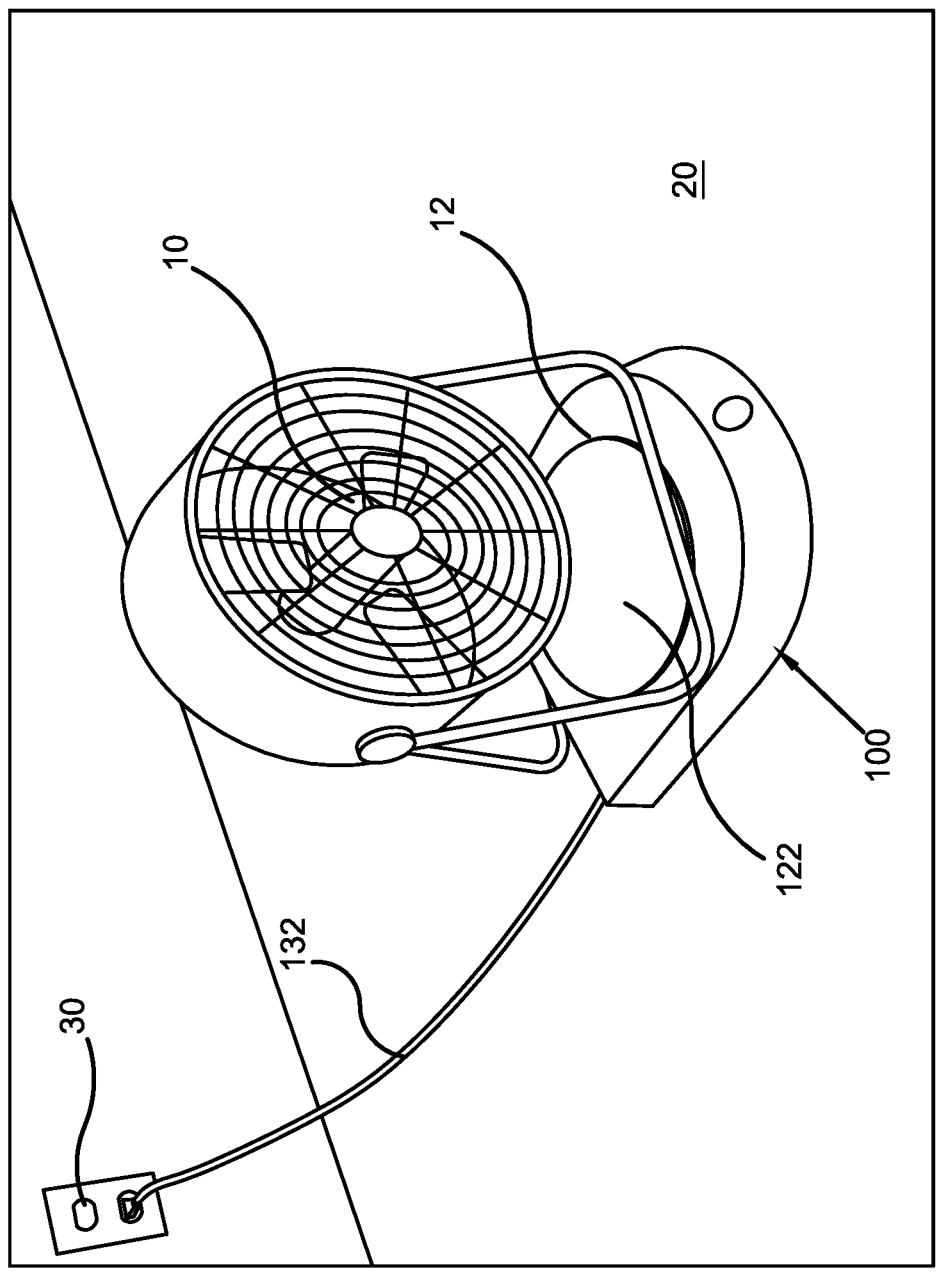
FIG. 4 illustrates a front perspective view of one potential embodiment of a portable oscillating fan platform device of the present invention while a non-oscillating fan 10 is atop the device in accordance with the disclosed architecture.

FIG. 4 illustrates a front perspective view of one potential embodiment of a portable oscillating fan platform device 100 of the present invention while a non-oscillating fan 10 is atop the device 100 in accordance with the disclosed architecture. To use the device 100, a user simply places a non-oscillating fan or heater 10 onto the platform 122 (e.g., the unit may also be strapped or otherwise attached to the platform to prevent the same from tipping over). The fan or heater 10 can then be plugged into a female power receptacle 136 located on the side surface 130 to receive power. The power receptacle 136 may be a USB port 134 as described above, but is preferably a female 110V/240V outlet. Then, the device 100 can be powered on, such that the fan/heater 10 receives power and can also be powered on. Once the device 100 has been powered on, the button 170 can be pressed such that the platform 122 will then rotate in order to rotate the fan/heater 10 atop the device 100. As a result, the device 100 allows the non-oscillating fan/heater 10 to move in a manner similar to an oscillating fan/heater.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "portable oscillating fan platform device" and "device" are interchangeable and refer to the portable oscillating fan platform device 100 of the present invention.

Notwithstanding the forgoing, the portable oscillating fan platform device 100 of the present invention and its various components can be of any suitable size and configuration as is known in the art without affecting the overall concept of the invention, provided that they accomplish the above-stated objectives. One of ordinary skill in the art will appreciate that the size, configuration and material of the portable oscillating fan platform device 100 as shown in the FIGS. are for illustrative purposes only, and that many other sizes and shapes of the portable oscillating fan platform device 100 are well within the scope of the present disclosure. Although the dimensions of the portable oscillating fan platform device 100 are important design parameters for user convenience, the portable oscillating fan platform device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A portable oscillating fan platform device comprising:
   a base comprised of a top surface having a rotating platform, a bottom surface that is generally parallel with the top surface, and a side surface;
   a power cord;
   a female power receptacle, positioned on the side surface;
   a shaft;
   a motor;
   a processor;
   at least one button; and
   a battery.

2. The portable oscillating fan platform device of claim 1, wherein the shaft is connected to and powered by the motor.

3. The portable oscillating fan platform device of claim 2, wherein the shaft is connected to the rotating platform and rotates the platform.

4. The portable oscillating fan platform device of claim 1, wherein the at least one button turns the portable oscillating fan platform device on and off.

5. The portable oscillating fan platform device of claim 4, wherein the rotating platform rotates when the portable oscillating fan platform device is powered on.

6. A portable oscillating fan platform device comprising:
   a base having a top surface, a bottom surface and a side surface;
   a rotating platform positioned on the top surface;
   a power cord;
   a female power receptacle;
   a motor;
   a battery;
   a shaft that connects to a bottom surface of the rotating platform and to the motor;
   a processor; and
   at least one button that allows a user to control the portable oscillating fan platform device.

7. The portable oscillating fan platform device of claim 6, wherein the at least one button turns the portable oscillating fan platform device on and off.

8. The portable oscillating fan platform device of claim 6, wherein the at least one button controls a rotation of the rotating platform.

9. The portable oscillating fan platform device of claim 6, wherein the female power receptacle is a 110V/240V female outlet.

10. The portable oscillating fan platform device of claim 9, wherein the female power receptacle supplies power to a non-oscillating fan or a non-oscillating heater that is used with the portable oscillating fan platform device.

11. A portable oscillating fan platform device comprising:
    a base having a top surface, a textured bottom surface, and a side surface;
    a power cord;
    a female power receptacle;
    a rotating platform with a textured top surface;
    a motor;
    a battery;
    a USB charging port;
    a shaft that connects to a bottom surface of the rotating platform and to the motor;
    a processor;
    at least one button that allows a user to control the portable oscillating fan platform device; and
    a remote.

12. The portable oscillating fan platform device of claim 11, wherein the at least one button is located on the remote.

13. The portable oscillating fan platform device of claim 12, wherein the remote is in wireless communication with the processor.

14. The portable oscillating fan platform device of claim 11, wherein the textured top surface is comprised of an anti-slip rubber material.

15. The portable oscillating fan platform device of claim 11, wherein the bottom surface is comprised of an anti-slip rubber material.

16. The portable oscillating fan platform device of claim 12, wherein the at least one button turns the portable oscillating fan platform device on and off.

17. The portable oscillating fan platform device of claim 12, wherein the at least one button controls the rotation of the rotating platform.

18. The portable oscillating fan platform device of claim 11, wherein the female power receptacle is a 110V/240V female outlet.

19. The portable oscillating fan platform device of claim 18, wherein the female power receptacle supplies power to a non-oscillating fan or a non-oscillating heater that is used with the portable oscillating fan platform device.

20. The portable oscillating fan platform device of claim 11, wherein the rotating platform can rotate 360 degrees.

* * * * *